US011015527B2

(12) United States Patent
Duffy et al.

(10) Patent No.: US 11,015,527 B2
(45) Date of Patent: May 25, 2021

(54) ENGINE BEARING OFFSET AND LOAD (71) Applicant: United Technologies Corporation, Farmington, CT (US)

(72) Inventors: Kevin Duffy, Hartford, CT (US); Ronnie K. Kovacik, Manchester, CT (US); Keven G. Van Duyn, Bloomfield, CT (US); Jonathan F. Zimmitti, Glastonbury, CT (US); Richard J. Rubendall, Wethersfield, CT (US); Michael M. Davis, North Granby, CT (US); Joseph G. Colucci, Milford, CT (US); Steven M. Danley, Ellington, CT (US); Christopher J. Zuck, Stevenson Ranch, CA (US); Tina Rezvani, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 261 days.

(21) Appl. No.: 15/821,157

(22) Filed: Nov. 22, 2017

(65) Prior Publication Data
US 2019/0153946 A1 May 23, 2019

(51) Int. Cl.
*F02C 7/06* (2006.01)
*F16C 19/54* (2006.01)
(Continued)

(52) U.S. Cl.
CPC ............... *F02C 7/06* (2013.01); *F01D 25/16* (2013.01); *F01D 25/162* (2013.01); *F16C 19/54* (2013.01);
(Continued)

(58) Field of Classification Search
CPC ...... F01D 25/162; F01D 25/16; F04D 29/046; F04D 29/056; F04D 29/059; F16C 35/061;
(Continued)

(56) References Cited

U.S. PATENT DOCUMENTS

| 3,909,085 | A | 9/1975 | Wilkinson et al. |
| 8,469,597 | B2 | 6/2013 | Smith et al. |
| 8,727,629 | B2 * | 5/2014 | Do ..................... F01D 25/164 384/494 |

FOREIGN PATENT DOCUMENTS

| DE | 803735 | 4/1951 |
| DE | 1229342 | 11/1966 |

(Continued)

OTHER PUBLICATIONS

EPO Official Letter dated Jan. 14, 2019 for EP Application No. 18207880.8.
Office action for EP18207880.8 dated Dec. 8, 2020.

*Primary Examiner* — Richard A Edgar
(74) *Attorney, Agent, or Firm* — Getz Balich LLC (57) ABSTRACT

Aspects of the disclosure are directed to a rotatable shaft, and a plurality of bearings coupled to the rotatable shaft, where the plurality of bearings include a first bearing, a second bearing, and a third bearing, where the first bearing defines an axial first bearing centerline, where the second bearing defines an axial second bearing centerline, where the third bearing defines an axial third bearing centerline, and where the axial second bearing centerline is radially offset from the axial first bearing centerline and the axial third bearing centerline.

17 Claims, 4 Drawing Sheets

(51) Int. Cl.
    *F01D 25/16*        (2006.01)
    *F16C 35/07*        (2006.01)
    *F16C 23/10*        (2006.01)
    *F16C 35/06*        (2006.01)

(52) U.S. Cl.
    CPC .............. *F16C 23/10* (2013.01); *F16C 35/07* (2013.01); *F05D 2240/50* (2013.01); *F05D 2250/312* (2013.01); *F05D 2250/40* (2013.01); *F16C 35/061* (2013.01); *F16C 2229/00* (2013.01); *F16C 2240/06* (2013.01); *F16C 2240/12* (2013.01); *F16C 2360/23* (2013.01)

(58) Field of Classification Search
    CPC .. F16C 35/07; F16C 2229/00; F16C 2240/06; F16C 2240/12; F16C 2360/23; F16C 19/54; F16C 23/10; F02C 7/06
    See application file for complete search history.

(56) References Cited

FOREIGN PATENT DOCUMENTS

| | | | | |
|---|---|---|---|---|
| GB | 174942 A | | 3/1923 | |
| GB | 736017 | | 8/1955 | |
| SU | 566953 A | * | 8/1977 | .............. F03B 11/00 |

* cited by examiner

ENGINE BEARING OFFSET AND LOAD

BACKGROUND

Engines, such as those which power aircraft and industrial equipment, may employ a compressor to compress air that is drawn into the engine and a turbine to capture energy associated with the combustion of a fuel-air mixture. One or more shafts mechanically couple the turbine and the compressor, such that the captured energy can be used to drive the compressor via the shaft(s). The shaft(s) are supported by one or more bearings. Typical bearings may include rolling elements disposed between bearing races/rings.

Bearings are often subjected to an applied force. The applied throe is frequently referred to as a load or in some cases a preload. In this document, load and preload may be used interchangeably. The load allows the bearings to maintain acceptable stiffness and reduces (e.g., minimizes) vibrations and noise of the bearings in the presence of misalignment that may be caused by wear, thermal expansion, or component tolerances. The value of the load influences the operation/functionality and lifetime of the bearing. For example, if the load applied to a bearing is low (e.g., is less than a threshold), the bearing may have a tendency to experience "skid". Skid is a condition where the rolling elements tend to slide against/relative to the races. On the other hand, if the load applied to a bearing is high (e.g., is greater than a threshold), the bearing may experience a shortened lifetime due to a high level of fatigue and increased torque levels.

The particular value of a load that is to be applied may be based on a variety of factors, such as for example a temperature range/envelope over which the engine operates, component tolerances, and a stiffness associated with the engine hardware; analogously, the stiffness may be expressed as a counterpart/reciprocal compliance of the engine hardware. The potential value of an applied load is a function of the stiffness of the engine system and can vary significantly between different engine configurations.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a rotatable shaft, and a plurality of bearings coupled to the rotatable shaft, where the plurality of bearings include a first bearing, a second bearing, and a third bearing, where the first bearing defines an axial first bearing centerline, where the second bearing defines an axial second bearing centerline, where the third bearing defines an axial third bearing centerline, and where the axial second bearing centerline is radially offset from the axial first bearing centerline and the axial third bearing centerline. In some embodiments, the first bearing is located axially forward of the second bearing, and the second bearing is located axially forward of the third bearing. In some embodiments, the first bearing is separated from the second bearing by a first axial distance, and the second bearing is separated from the third bearing by a second axial distance. In some embodiments, the first axial distance is less than the second axial distance. In some embodiments, the first bearing includes a first race, a second race, and a first rolling element, and where the second bearing includes a third race, a fourth race, and a second rolling element, and where the axial first bearing centerline defined by either the first or second race is radially offset from the axial second bearing centerline defined by either the third or fourth race. In some embodiments, the axial first bearing centerline and the axial third bearing centerline substantially coincide with one another on a same centerline. In some embodiments, the shaft defines an axial shaft centerline, and where the axial second bearing centerline is offset from the axial shaft centerline by a radial distance. In some embodiments, the axial first bearing centerline is offset from the axial shaft centerline by a second radial distance. In some embodiments, the radial distance is different from the second radial distance.

Aspects of the disclosure are directed to an engine comprising: a compressor section, a turbine section, a shaft that couples the turbine section and the compressor section, the shaft rotatable about an axial shaft centerline, a first bearing coupled to the shaft that defines an axial first bearing centerline, a second bearing coupled to the shaft that defines an axial second bearing centerline, and a third bearing coupled to the shaft that defines an axial third bearing centerline, where the axial second bearing centerline is radially offset from at least one of the axial shaft centerline, the axial first bearing centerline, or the axial third bearing centerline. In some embodiments, the axial second bearing centerline is radially offset from the axial shaft centerline. In some embodiments, the axial first bearing centerline is radially offset from the axial shaft centerline. In some embodiments, the axial shaft centerline, the axial first bearing centerline, and the axial third bearing centerline substantially coincide with one another. In some embodiments, the engine defines an engine centerline coincident with the shaft centerline, and where the first bearing is located forward of the second bearing with respect to the engine centerline, and where the second bearing is located forward of the third bearing with respect to the engine centerline. In some embodiments, an amount of the offset is based on a stiffness associated with at least one of the compressor section, the turbine section, or the shaft. In some embodiments, an amount of the offset is based on a stiffness associated with the compressor section, the turbine section, and the shaft. In some embodiments, an amount of the offset provides a load from the shaft to the second bearing to reduce a propensity to skid of the second bearing.

Aspects of the disclosure are directed to a method comprising: determining a value of a factor associated with a compressor section of a gas turbine engine, a turbine section of the gas turbine engine, and a shaft of the gas turbine engine that connects the compressor section and the turbine section, determining a value of a force that is to be applied to a first bearing of the gas turbine engine to reduce a probability of skid from occurring with respect to the first bearing to an amount that is less than a threshold, and based on the determined value of the factor and the determined value of the force, offsetting an axial first bearing centerline defined by the first bearing by a radial distance relative to at least one of an axial second bearing centerline defined by a second bearing of the gas turbine engine, an axial third bearing centerline defined by a third bearing of the gas turbine engine, or an axial shaft centerline defined by the shaft. In some embodiments, the factor is based on a stiffness associated with the compressor section, the turbine section, and the shaft, a temperature range over which the gas turbine engine operates, a tolerance associated with the shaft, and a tolerance of a component that is located in the compressor section or the turbine section.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems, and methods are described for applying a load to one or more bearings. The practice of intentionally loading a bearing with non-operational loads is commonly referred to as "preloading" the bearing. In some embodiments, the preload that is applied may help to reduce the likelihood of, or even prevent, a skid condition from occurring with respect to a bearing of an engine. In some embodiments, a bearing may be offset relative to a shaft or one or more additional bearings in order to obtain the load.

Figure 1:
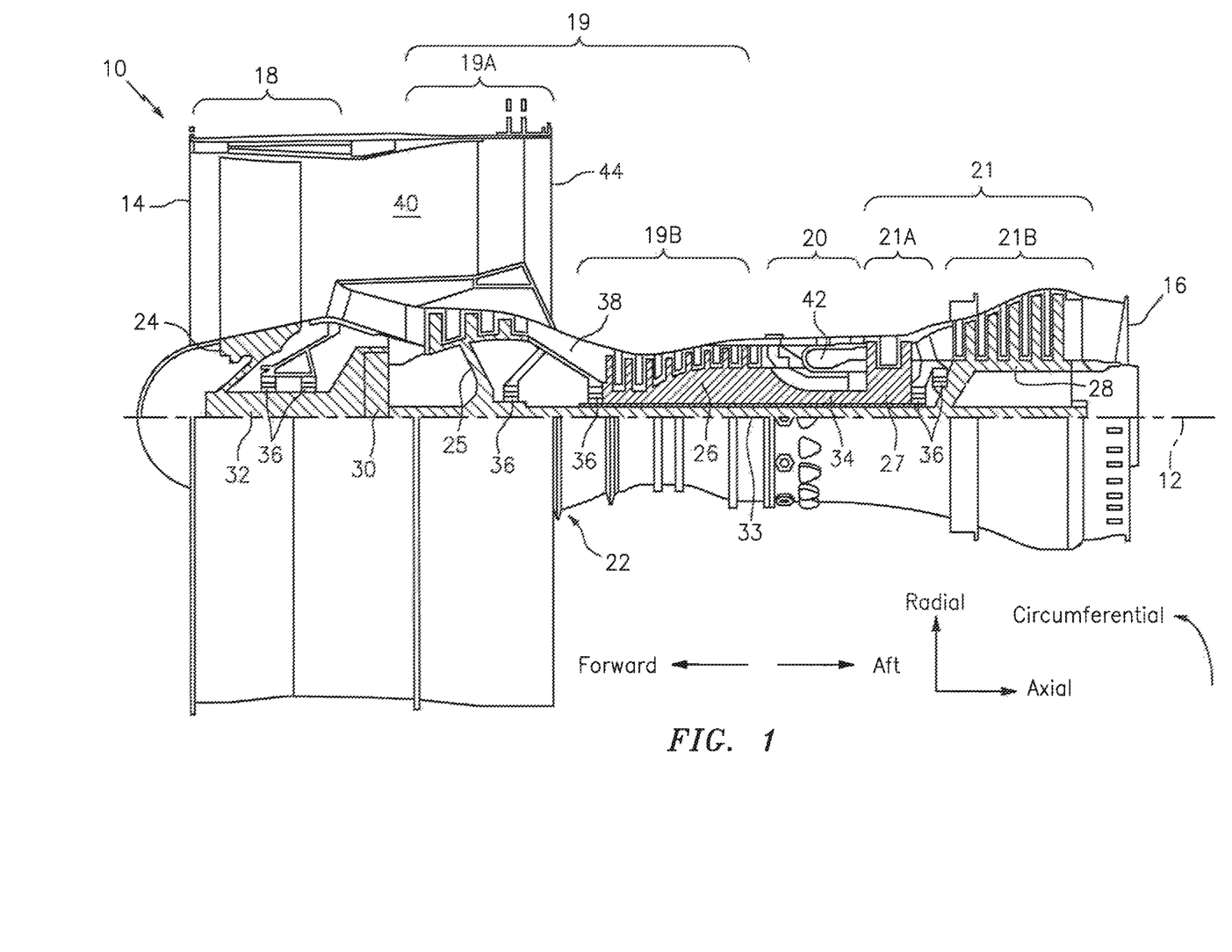
FIG. 1 is a side cutaway illustration of a gas turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. 'The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of e disclosure may be applied in connection with non-geared engines.

Figure 2A:
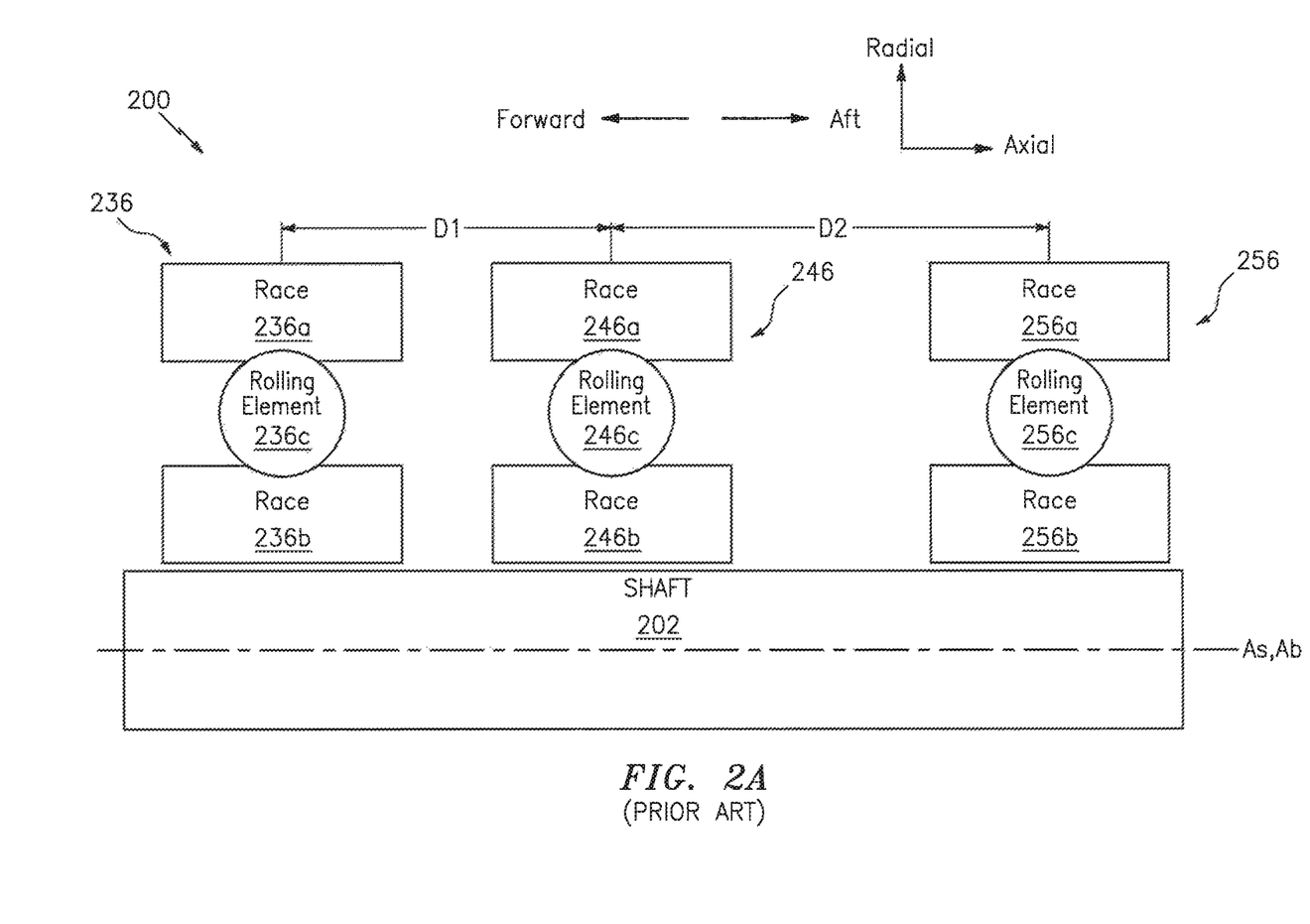
FIG. 2A illustrates a system of an engine in accordance with the prior art.

FIG. 2A illustrates a system 200 of an engine in accordance with the prior art. The system 200 includes a shaft 202 (which may correspond to one of the shafts 32-34 of FIG. 1), a first hearing 236, a second bearing 246, and a third bearing 256. The bearings 236-256 may correspond to the bearings 36 of FIG. 1. The first bearing 236 is located forward of the second bearing 246, and the second bearing 246 is located forward of the third bearing 256.

The first bearing 236 includes a first race 236a, a second race 236b, and a rolling element 236c radially disposed between the first race 236a and the second race 236b. The second race 236h is located radially inward/inboard of the first race 236a.

The second bearing 246 includes a first race 246a, a second race 246b, and a rolling element 246c radially disposed between the first race 246a and the second race 246b. The second race 246b is located radially inward/inboard of the first race 246a.

The third bearing 256 includes a first race 256a, a second race 256b, and a rolling element 256c radially disposed between the first race 256a and the second race 256b. The second race 256b is located radially inward/inboard of the first race 256a.

The races 236b, 246b, and 256b are disposed on the shaft 202 and rotate with the shaft 202 when the engine is operated. The races 236a, 246a, and 256a are coupled to fixed structure of the engine, which is to say that the races 236a, 246a, and 256a are stationary during the operation of the engine.

The first bearing 236 is separated from the second bearing 246 by a first (axial) distance D1. The second bearing 246 is separated from the third bearing by a second (axial) distance D2. The first distance D1 and the second distance D2 may be different from one another; for example, the first distance D1 may be less than the second distance D2.

Superimposed in FIG. 2A is a (n axial) centerline As associated with the shaft 202. The centerline As of the shaft 202 coincides with a(n axial) centerline Ab of the bearings 236-256.

The system 200 (e.g., one or more of the bearings 236-256) may be prone to skid as described above. Such skid may be caused by a load applied to one or more of the bearings 236-256 being less than a threshold.

In order to reduce (e.g., minimize) the likelihood of a skid condition from occurring with respect to a bearing, the bearing may be offset (relative to a shaft and/or one or more other bearings) to ensure that a load in an amount greater than a threshold is applied to the bearing. For example, and referring to FIG. 2B, a system 200' is shown. The system 200' includes many of the same types of features shown and described above in conjunction with the system 200 of FIG. 2A; as such, a complete re-description of those features is omitted herein for the sake of brevity. Features in FIG. 2B that are similar to features shown in FIG. 2A utilize the same reference number/character, but have a prime (') symbol appended thereto in FIG. 2B.

Figure 2B:
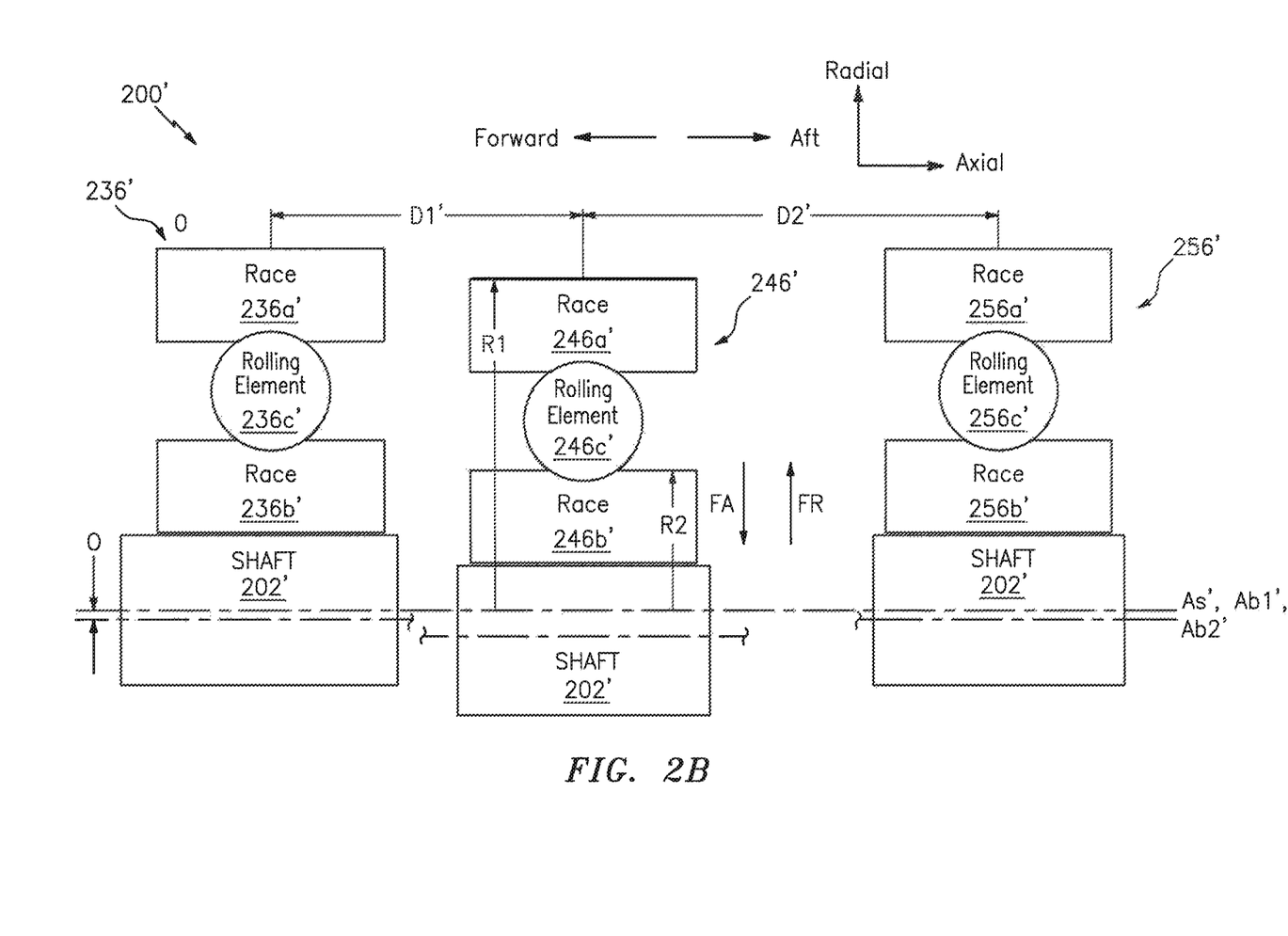
FIG. 2B illustrates a system of an engine in accordance with aspects of this disclosure.

As shown in FIG. 2B, the shaft 202' may have a centerline As' (which may coincide with a centerline Ab1',3' of the first bearing 236' and the third bearing 256'). However, the centerline As' of the shaft 202' may not coincide with a centerline Ab2' of the second bearing 246'. For example, a bearing centerline Ab2' of the second bearing 246' may be offset from the shaft centerline As' by an amount O. The offset O may be due to the bearing 246' having been shifted radially. For example, and assuming a baseline associated with a location/position of the shaft 202 and the bearings 236-256 in FIG. 2A, the offset O may be obtained in FIG. 2B by shifting/displacing the position of the bearing 246' radially relative to the position of the bearing 246.

The offset O may be obtained based on offsetting/displacing a position of one or more of the races 246a' and 246b'. For example, and as shown in FIG. 2B, the race 246a' may define a radius R1 (relative to, e.g., the shaft centerline As') and the race 246b' may define a radius R2 (relative to, e.g., the shaft centerline As'). A modification of (a value of) one or both of the radii R1 or R2 may provide for the offset O. An adjustment that is provided may be symmetrical or asymmetrical with respect to the races 246a' and 246b' (or, analogously, the radii R1 and R2).

As shown in FIG. 2B, the shift/displacement (represented by the offset O) of the bearing 246' in FIG. 2B may tend to impose a(n incremental) force FA on the shaft 202'. The force FA may have a tendency to bend the shaft 202' in the direction of the force FA. The shaft 202' may tend to resist the force FA, such that the shaft 202' may in turn impose a force FR on the bearing 246'. In accordance with Newton's third law, the force FR may be equal in magnitude and opposite in direction to the force FA. This force FR may tend to impose a load on the bearing 246', which may help to reduce (e.g., avoid) a skid condition with respect the bearing 246'.

While the second/middle bearing 246' is shown as having been offset/shifted/displaced in FIG. 2B (relative to FIG. 2A), any of the bearings may be offset/shifted/displaced in order to address the potential for skid with respect to one or more bearings. Applying an offset to a given bearing relative to, e.g., the shaft and/or other bearings may tend to redistribute loads that are applied to the bearings. In this manner, flexibility may be obtained in terms of a load applied to a bearing based on changing a position of a bearing relative to the shaft and/or the other bearings.

The particular amount/value of an offset (e.g., the offset O in FIG. 2B) that is used in a given embodiment may be a function of a variety of factors, such as for example a temperature range/envelope over which an engine operates, component tolerances, and stiffness associated with the engine hardware. An offset, such as the offset O, may be expressed in accordance with a three associated with a spring. For example, an expression of the form F~kO may be used where 'F' corresponds to the load applied to the bearing, 'k' corresponds to a value of a factor associated with, e.g., the stiffness of the hardware (along with potentially other factors as described above), and represents a proportional relationship. Thus, assuming that the load (represented by 'F') and the factor (represented by 'k') are known or can be determined, the offset O may be proportional to (e.g., approximately equal to) F/k.

Figure 3:
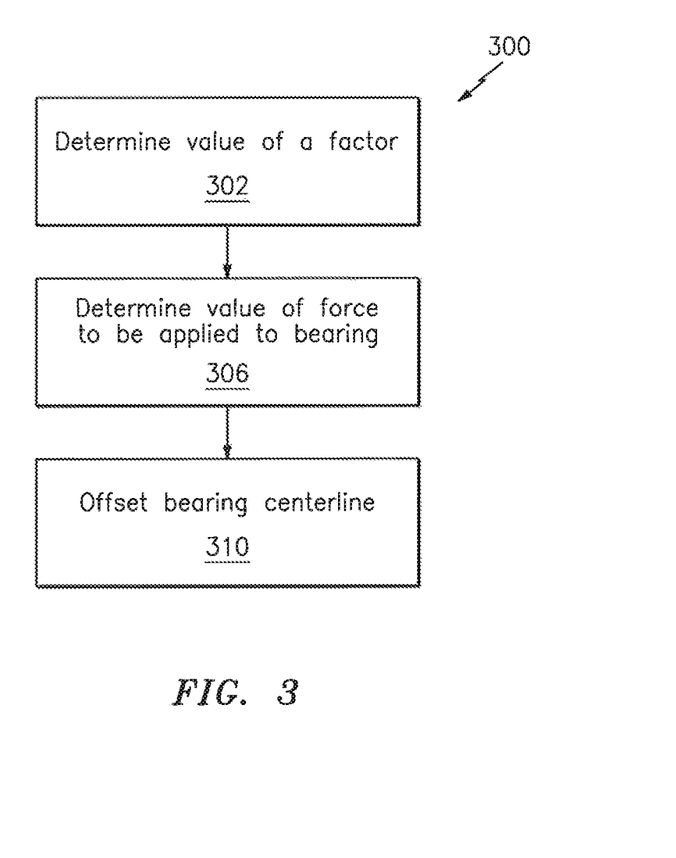
FIG. 3 illustrates a flow chart of a method for offsetting a bearing in accordance with aspects of this disclosure.

Referring to FIG. 3, a flow chart of a method 300 in accordance with aspects of this disclosure is shown. In particular, the method 300 may be used to adjust (e.g., offset) one or more bearings relative to one or more other bearings and/or a shaft in the manner described above.

In block 302, a value of a factor (e.g., factor 'k' described above) may be determined. For example, the factor may be based on one or more of a stiffness associated with engine hardware (e.g., compressor section, turbine section, shaft, etc.), a temperature range/envelope over which an engine operates, component tolerances, etc. The determination of block 302 may be based on experimentation, simulation, empirical studies/validation, etc.

In block 306, a value of a force that is to be applied to a bearing may be determined. The force may be selected to reduce the probability/likelihood of skid from occurring with respect to the bearing (e.g., reducing to be less than a threshold). The determination of block 306 may be based on experimentation, simulation, empirical studies/validation, etc.

In block 310, based on the determined value of the factor (block 302) and the determined value of the force (block 306), a bearing centerline may be offset relative to, e.g., one or more other bearing centerlines and/or a shall centerline. The offset may be based on (e.g., proportional to) the value of the force divided by the value of the factor, e.g., offset—force/factor.

As described above, the distances D1 and D2 of FIG. 2A (or, analogously, the distances D1' and D2' of FIG. 2B) may differ from one another. Bearings that are closer to one another may tend to be more responsive to changes in position/location in terms of a modified value of a load that is applied to those bearings. Thus, assuming that the distance D1' is less than the distance D2' in FIG. 2B, a change in the position/location of the bearing 246' may have a tendency to have a greater impact (e.g., a greater change) on the load that is applied to the bearing 236' relative to the (change in the) load that is applied to the bearing 256'.

Aspects of the disclosure may provide an ability to finely tune loads that are imposed on bearings of an engine. For example, if a surface on which a bearing is mounted may be dynamically adjusted, engine hardware may be fabricated (e.g., assembled) to a nominal specification and then adjusted to suit the particular parameters of a given instance of the engine. In some embodiments, a housing/bearing compartment that contains the bearings may include an adjustable feature to accommodate an adjustment of the bearing position.

In accordance with aspects of this disclosure, the potential for a skid condition occurring with respect to a bearing may be reduced (e.g., minimized) while simultaneously avoiding applying excessive load to the bearing. A reduction in the likelihood/propensity of skid may be obtained by displacing one or more bearings relative to one or more other bearings and/or a shaft of an engine. A bearing that has a likelihood of skid occurring being less than a threshold may be referred to as being skid-free.

While some of the examples described herein pertain specifically to engines, aspects of the disclosure may be applied in connection with other application environments. For example, aspects of the disclosure may be applied in connection with rotatable machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
a rotatable shaft; and
a plurality of bearings coupled to the rotatable shaft,
wherein the plurality of bearings include a first bearing, a second bearing, and a third bearing,
wherein the first bearing defines an axial first bearing centerline,
wherein the second bearing defines an axial second bearing centerline,
wherein the third bearing defines an axial third bearing centerline,
wherein the axial second bearing centerline is radially offset from the axial first bearing centerline and the axial third bearing centerline by a radial offset distance such that the rotatable shaft applies an actual load force to the second bearing,
wherein a first value of a calculated load force to be applied to the second bearing by the rotatable shaft is configured to reduce a probability of skid from occurring with respect to the second bearing to an amount that is less than a threshold,
wherein a second value of a factor is based on at least a stiffness of the rotatable shaft, and
wherein the radial offset distance of the axial second bearing centerline from the axial first bearing centerline and the axial third bearing centerline is proportional to the first value divided by the second value such that the actual load force applied to the second bearing is equal to the first value of the calculated load force.

2. The system of claim 1, wherein the first bearing is located axially forward of the second bearing, and wherein the second bearing is located axially forward of the third bearing.

3. The system of claim 2, wherein the first bearing is separated from the second bearing by a first axial distance, and wherein the second bearing is separated from the third bearing by a second axial distance.

4. The system of claim 3, wherein the first axial distance is less than the second axial distance.

5. The system of claim 1, wherein the first bearing includes a first race, a second race, and a first rolling element, and wherein the second bearing includes a third race, a fourth race, and a second rolling element, and wherein the axial first bearing centerline defined by either the first or second race is radially offset from the axial second bearing centerline defined by either the third or fourth race.

6. The system of claim 5, wherein the axial first bearing centerline and the axial third bearing centerline substantially coincide with one another on a same centerline.

7. The system of claim 1, wherein the shaft defines an axial shaft centerline, and wherein the axial second bearing centerline is offset from the axial shaft centerline by a radial distance.

8. The system of claim 7, wherein the axial first bearing centerline is offset from the axial shaft centerline by a second radial distance.

9. The system of claim 1, wherein the calculated load force that is to be applied to the second bearing is a minimum load force necessary to reduce the probability of skid from occurring with respect to the second bearing to the amount that is less than the threshold.

10. An engine comprising:
a compressor section;
a turbine section;
a shaft that couples the turbine section and the compressor section, the shaft rotatable about an axial shaft centerline;
a first bearing coupled to the shaft that defines an axial first bearing centerline;
a second bearing coupled to the shaft that defines an axial second bearing centerline; and
a third bearing coupled to the shaft that defines an axial third bearing centerline,
wherein the axial second bearing centerline is radially offset from at least one of the axial shaft centerline, the axial first bearing centerline, or the axial third bearing centerline by a radial offset distance such that the rotatable shaft applies an actual load force to the second bearing,
wherein a first value of a calculated load force to be applied to the second bearing by the rotatable shaft is configured to reduce a probability of skid from occurring with respect to the second bearing to an amount that is less than a threshold,
wherein a second value of a factor is based on at least a stiffness of the compressor section, the turbine section, and the shaft, and
wherein the radial offset distance of the axial second bearing centerline from the axial first bearing centerline and the axial third bearing centerline is proportional to the first value divided by the second value such that the actual load force applied to the second bearing is equal to the first value of the calculated load force.

11. The engine of claim 10, wherein the axial second bearing centerline is radially offset from the axial shaft centerline.

12. The engine of claim 10, wherein the axial shaft centerline, the axial first bearing centerline, and the axial third bearing centerline substantially coincide with one another.

13. The engine of claim 10, wherein the engine defines an engine centerline coincident with the shaft centerline, and wherein the first bearing is located forward of the second bearing with respect to the engine centerline, and wherein the second bearing is located forward of the third bearing with respect to the engine centerline.

14. The engine of claim 10, wherein the calculated load force that is to be applied to the second bearing is a minimum load force necessary to reduce the probability of skid from occurring with respect to the first second bearing to an the amount that is less than a-the threshold.

15. A method comprising:
determining a first value of a factor based on at least a stiffness of a compressor section of a gas turbine engine, a turbine section of the gas turbine engine, and a shaft of the gas turbine engine that connects the compressor section and the turbine section;
determining a second value of a calculated load force that is to be applied to a first bearing of the gas turbine engine to reduce a probability of skid from occurring with respect to the first bearing to an amount that is less than a threshold;
based on the determined first value of the factor and the determined second value of the calculated load force, offsetting an axial first bearing centerline defined by the first bearing by a radial offset distance, proportional to the second value of the calculated load force divided by the first value of the factor, relative to at least one of an axial second bearing centerline defined by a second bearing of the gas turbine engine, an axial third bearing centerline defined by a third bearing of the gas turbine engine, or an axial shaft centerline defined by the shaft, such that an actual load force applied to the first bearing is equal to the second value of the calculated load force.

16. The method of claim 15, wherein the factor is additionally based on at least a temperature range over which the gas turbine engine operates, a tolerance associated with the shaft, and a tolerance of a component that is located in the compressor section or the turbine section.

17. The method of claim 15, wherein the calculated load force that is to be applied to the first bearing is a minimum load force necessary to reduce the probability of skid from occurring with respect to the first bearing to the amount that is less than the threshold.

* * * * *